(12) United States Patent
Shah et al.

(10) Patent No.: US 6,965,602 B2
(45) Date of Patent: Nov. 15, 2005

(54) SWITCH FABRIC CAPABLE OF AGGREGATING MULTIPLE CHIPS AND LINKS FOR HIGH BANDWIDTH OPERATION

(75) Inventors: Dipak Shah, San Jose, CA (US); Tzu-Jen Kuo, San Jose, CA (US)

(73) Assignee: Peta Switch Solutions, Inc., San Jose, CA (US)

( * ) Notice: Subject to any disclaimer, the term of this patent is extended or adjusted under 35 U.S.C. 154(b) by 835 days.

(21) Appl. No.: 09/759,434

(22) Filed: Jan. 12, 2001

(65) Prior Publication Data

US 2003/0099242 A1 May 29, 2003

(51) Int. Cl.[7] ............................................. H04L 12/56
(52) U.S. Cl. ..................... 370/395.4; 370/392; 370/401; 370/412
(58) Field of Search ...................... 370/395.4, 395.41, 370/395.1, 395.42, 395.43, 412–419, 400, 401, 386, 389, 392, 428, 474, 475, 476, 472, 473

(56) References Cited

U.S. PATENT DOCUMENTS

| | | | |
|---|---|---|---|
| 4,965,788 A | 10/1990 | Newman | 370/410 |
| 5,467,347 A | 11/1995 | Petersen | 370/230 |
| 5,475,682 A | 12/1995 | Choudhury et al. | |
| 5,544,168 A | 8/1996 | Jeffrey et al. | 370/391 |
| 5,703,879 A | 12/1997 | Proctor et al. | 370/398 |
| 5,790,522 A | 8/1998 | Fichou et al. | |
| 5,790,539 A * | 8/1998 | Chao et al. | 370/390 |
| 6,067,286 A | 5/2000 | Jones et al. | 370/218 |
| 6,118,761 A | 9/2000 | Kalkunte et al. | |
| 6,144,635 A | 11/2000 | Nakagawa | |
| 6,147,996 A * | 11/2000 | Laor et al. | 370/394 |
| 6,246,692 B1 | 6/2001 | Dai et al. | 370/438 |
| 6,438,106 B1 * | 8/2002 | Pillar et al. | 370/232 |
| 6,438,132 B1 * | 8/2002 | Vincent et al. | 370/395.42 |
| 6,535,510 B2 | 3/2003 | Kalkunte et al. | 370/389 |
| 6,542,507 B1 * | 4/2003 | Khacherian et al. | 370/395.43 |
| 6,567,417 B2 | 5/2003 | Kalkunte et al. | 370/428 |
| 6,603,771 B1 * | 8/2003 | Raza | 370/412 |
| 6,636,510 B1 | 10/2003 | Lee et al. | |
| 6,643,256 B1 | 11/2003 | Shimojo et al. | |
| 6,646,983 B1 * | 11/2003 | Roy et al. | 370/218 |
| 6,658,016 B1 | 12/2003 | Dai et al. | 370/424 |
| 6,680,910 B1 | 1/2004 | Ni | |
| 6,721,273 B1 | 4/2004 | Lyon | |
| 6,747,971 B1 | 6/2004 | Hughes et al. | |
| 2002/0012340 A1 | 1/2002 | Kalkunte et al. | 370/360 |
| 2002/0012341 A1 | 1/2002 | Battle et al. | 370/378 |
| 2002/0027908 A1 | 3/2002 | Kalkunte et al. | 370/389 |
| 2002/0136211 A1 | 9/2002 | Battle et al. | 370/389 |
| 2003/0097467 A1 | 5/2003 | Sano | 709/238 |
| 2003/0118016 A1 | 6/2003 | Kalkunte et al. | 370/389 |
| 2003/0198231 A1 | 10/2003 | Kalkunte et al. | 370/395.31 |

OTHER PUBLICATIONS

"Common Switch Interface Specification–LI, version 1.0", CSIX, Aug. 5, 2000, http://www.csix.org.

(Continued)

*Primary Examiner*—Brian Nguyen

(57) ABSTRACT

A switching fabric capable of supporting high bandwidth switching operations is disclosed. In one aspect, multiple switching chips and multiple links thereto are used to provide a high bandwidth switching fabric. In another aspect, payload data is transmitted following grant of its previously transmitted corresponding request. In yet another aspect, the switching fabric operates in a pipelined manner.

19 Claims, 11 Drawing Sheets

OTHER PUBLICATIONS

M. Shreedhar and George Varghese, "Efficient Fair Queuing Using Deficit Round–Robin", IEEE/ACM Transactions on Networking, vol. 4, No. 3, Jun. 1996.

Nick McKeown, "iSLIP: The iSLIP Scheduling Algorithm for Input–Queued Switches", IEEE/ACM Transactions on Networking, vol. 7, No. 2, pp. 188–201, Apr. 1999.

Kenneth Y. Yun, "A Terabit Multi–Service Switch With Quality Of Service Support", HOT Interconnect 8, pp. 21–30, Aug. 2000.

Nick McKeown, "Fast Switched Backplane for a Gigabit Switched Router", Department of Engineering, Stanford University, Stanford, CA.

McKeown et al., "The Tiny Tera: A Packet Switch Core", Hot Interconnects V, Stanford University, Aug. 1996.

Ohsaki et al., "Performance of an Input/Output Buffered–Type ATM LAN Switch with Back–Pressure Function", IEEE/ACM Transactions on Networking, vol. 5, No. 2, Apr. 1997.

Prabhakar et al., "Multicast Scheduling for Input–Queued Switches", IEEE Journal on Selected Areas in Communications, May 1996.

* cited by examiner

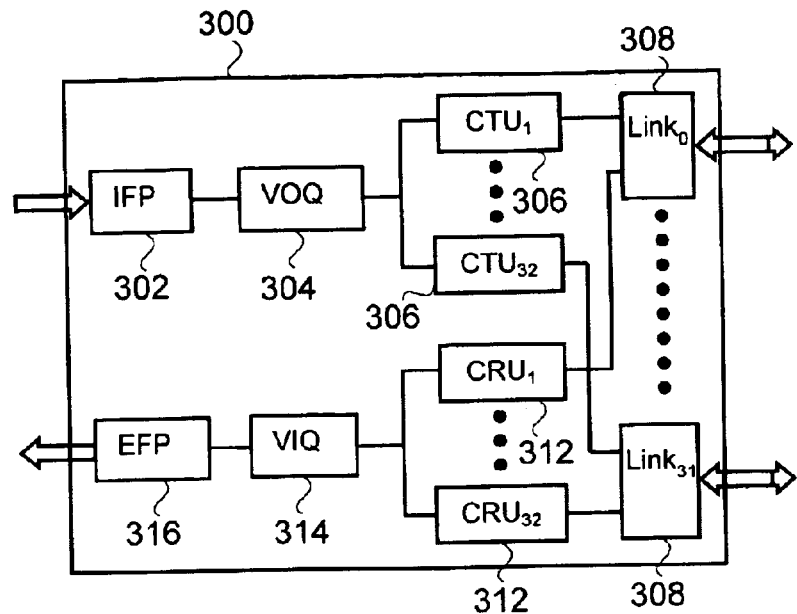
FIG. 3 [VQM]
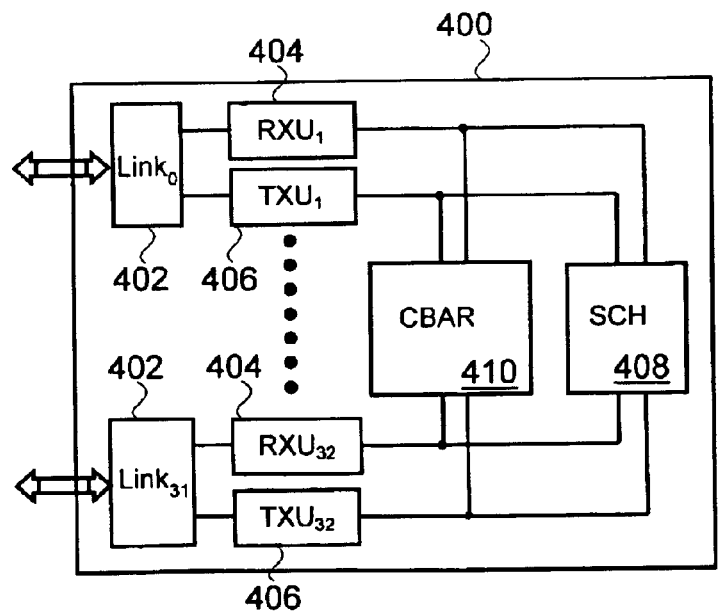
FIG. 4 [CSW]

SWITCH FABRIC CAPABLE OF AGGREGATING MULTIPLE CHIPS AND LINKS FOR HIGH BANDWIDTH OPERATION

BACKGROUND OF THE INVENTION

1. Field of the Invention

The present invention relates to network switching devices and, more particularly, to high bandwidth switching devices.

2. Description of the Related Art

Today's communication markets continue to show strong growth as the bandwidth needed to satisfy the demands of the information age increases. In the carrier markets demand is being driven by the need for bandwidth-hungry data services alongside revenue-generating voice traffic. Digital Subscriber Line (DSL) technology may boost access bandwidth by one or two orders of magnitude while the core is benefiting from the provisioning of high numbers of DWDM (Dense Wavelength Division Multiplexing) circuits at higher bandwidths. Service providers are focusing their resources to create value-added intelligent edge services while the long haul and network core are seen as providing a low cost, high bandwidth interconnect. The metropolitan optical transport network with feeds from edge routers and switches must therefore support a broad variety of services and protocols.

Recent advances in switching have resulting in replacement of shared backplanes with switched backplanes because switched backplanes allow for the simultaneous transfer of multiple packets. See McKeown, "Fast Switched Backplane for a Gigabit Switched Router," Cisco Systems, Inc., White Paper. These switched backplanes or switch fabrics are use for routing, switching and optical transport markets. Unfortunately, these recent advances still have performance (e.g., bandwidth) constraints. One particular constraint is that current architectures are not readily scalable to support higher bandwidths. Therefore, scalable, higher performance switch fabrics are needed to support routing, switching and optical transport markets.

SUMMARY OF THE INVENTION

Broadly speaking, the invention relates to a switching fabric capable of supporting high bandwidth switching operations. In one aspect of the invention, multiple switching chips and multiple links thereto are used to provide a high bandwidth switching fabric. In another aspect of the invention, payload data is transmitted following grant of its previously transmitted corresponding request. In yet another aspect of the invention, the switching fabric operates in a pipelined manner.

The invention can be implemented in numerous ways including, as an apparatus, system, device, method, or a computer readable medium. Several embodiments of the invention are discussed below.

As a switching system, one embodiment of the invention includes at least: a plurality of virtual queue managers that store data; and a plurality of switch circuits, each of the switch circuits being operatively connected to each of the virtual queue managers, and at least one of the switch circuits having an internal scheduler. The internal scheduler selects at least one of the virtual queue managers to send data to the plurality of switch circuits.

As a multi-port, pipelined concurrent switching apparatus, one embodiment of the invention includes at least a switch fabric that can aggregate links and multiple switching chips without inter-chip scheduling communications between any of the multiple switching chips, thereby supporting higher switching bandwidth per port.

As a switching apparatus, one embodiment of the invention includes at least: a plurality of queues for storing blocks of data, each block including a request and a payload, and each of the requests stored in the queues being associated with one of the payloads stored in the queues; and a plurality of switches, at least one of the switches including a scheduler that arbitrates requests sent by the queues to the scheduler. Each of the requests, when issued to the scheduler, operates to request switching the associated payload through the switches in a particular manner. Each of the requests are issued in advance of sending the associated payloads, and only after a particular request is granted does the associated payload get transmitted from the associated one or more of the queues to the switches where the associated payload is passed through the switches.

As a method for operating a switching apparatus, one embodiment of the invention includes at least the operations of: (a) sending a first request to transmit a first payload through the switching apparatus; (b) determining whether the first request has been granted; (c) sending a subsequent request to transmit a subsequent payload through the switching apparatus; and (d) sending, concurrently with the sending (c), the first payload when the determining (d) has determined that the first grant has been granted.

As a method for operating a switching apparatus having multiple virtual queues and multiple switch chips, one embodiment of the invention includes at least the operations of: (a) receiving an incoming packet to be passed through the switching apparatus; (b) dividing the incoming packet into a plurality of fixed length blocks, the blocks including at least a header, a payload and a payload header, the header including control information, and the payload header including a destination indicator for the payload; (c) temporarily storing the blocks in the virtual queues; (d) determining when the payloads associated with the blocks associated with the incoming packet that are stored in the virtual queues are to be passed through the switching chips; (e) concurrently transferring each of the payloads and their payload headers for the blocks that are associated with the incoming packet from the virtual queues to different ones of the switch chips when the determining (d) determines that the payloads associated with the blocks are to be passed through the switch chips; and (f) concurrently switching the blocks associated with the incoming packet through the switch chips in accordance with the destination identifier provided within the payload header of each of the blocks.

A method for switching a block of data through a switch system having virtual queues and switching devices, at least one of the switching devices including a scheduler, one embodiment of the invention includes at least the operations of: (a) receiving, at a switching device including a scheduler, a block from a virtual queue, the block including a header, a payload and a payload header; (b) directing the header of the block to the scheduler, and directing the payload and the payload header to the switching device; and (c) switching the payload through the switching device in accordance with the payload header.

As a switching system, one embodiment of the invention includes at least: a plurality of virtual queue managers that store data; and a plurality of switch circuits, each of the switch circuits being operatively connected to each of the virtual queue managers, and each of the switch circuits including at least an internal scheduler. The internal schedulers operate to switch in a synchronized manner to thereby concurrently send data (provided by one or more of the virtual queue managers) through the plurality of switch circuits.

As a method for operating a switching apparatus having multiple virtual queues and multiple switch chips, one embodiment of the invention includes at least the operations of: (a) receiving an incoming packet to be passed through the switching apparatus; (b) dividing the incoming packet into a plurality of fixed length blocks, the blocks including at least a header, a payload, the header including control information; (c) temporarily storing the blocks in the virtual queues; (d) concurrently transferring the header and the payloads for the blocks that are associated with the incoming packet from the virtual queues to different ones of the switch chips; (e) scheduling, independently and simultaneously at each of the switch chips, when the payloads associated with the blocks associated with the incoming packet are to be passed through the switching chips; and (f) concurrently switching the blocks in accordance with the scheduling (e).

As a method for switching a block of data through a switch system having a plurality of virtual queues and a plurality of switching devices, each of the switching devices including an internal scheduler and a switch, one embodiment of the invention includes at least the operations of: (a) receiving, at each of the switching devices, a header from one or more of the virtual queues and at least a portion of a payload from one or more of the virtual queues; (b) directing, at each of the switching device, the header to the internal scheduler and directing the at least a portion of the payload to the switch; (c) producing, at each of the schedulers, switching information based on the header from one or more of the virtual queues; and (d) switching the payload through the switch in accordance with the switching information.

As a method for switching a block of data through a switch system having a plurality of packet forwarding devices and a plurality of switch devices, the switch devices include at least virtual queues and switch circuits, one embodiment of the invention includes at least the operations of: (a) receiving, at each of the switching devices, a header and at least a portion of a payload from one or more of the packet forwarding devices; (b) directing, at each of the switching devices, the payload to the virtual queues based on the header; (c) storing the payload in the virtual queues; and (d) switching the payload from a source location in the virtual queues to a destination location in the virtual queues based on determined control information.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 3 is a block diagram of a virtual queue manager according to one embodiment of the invention;

FIG. 4 is a block diagram of a concurrent switch according to one embodiment of the invention;

DETAILED DESCRIPTION OF THE INVENTION

The invention relates to a switching fabric (e.g., switching apparatus or system) capable of supporting high bandwidth switching operations. In one aspect of the invention, multiple switching chips and multiple links thereto are used to provide a high bandwidth switching fabric. In another aspect of the invention, payload data is transmitted following grant of its previously transmitted corresponding request. In yet another aspect of the invention, the switching fabric operates in a pipelined manner.

Embodiments of this aspect of the invention are discussed below with reference to FIGS. 1–8. However, those skilled in the art will readily appreciate that the detailed description given herein with respect to these figures is for explanatory purposes as the invention extends beyond these limited embodiments.

Figure 1:
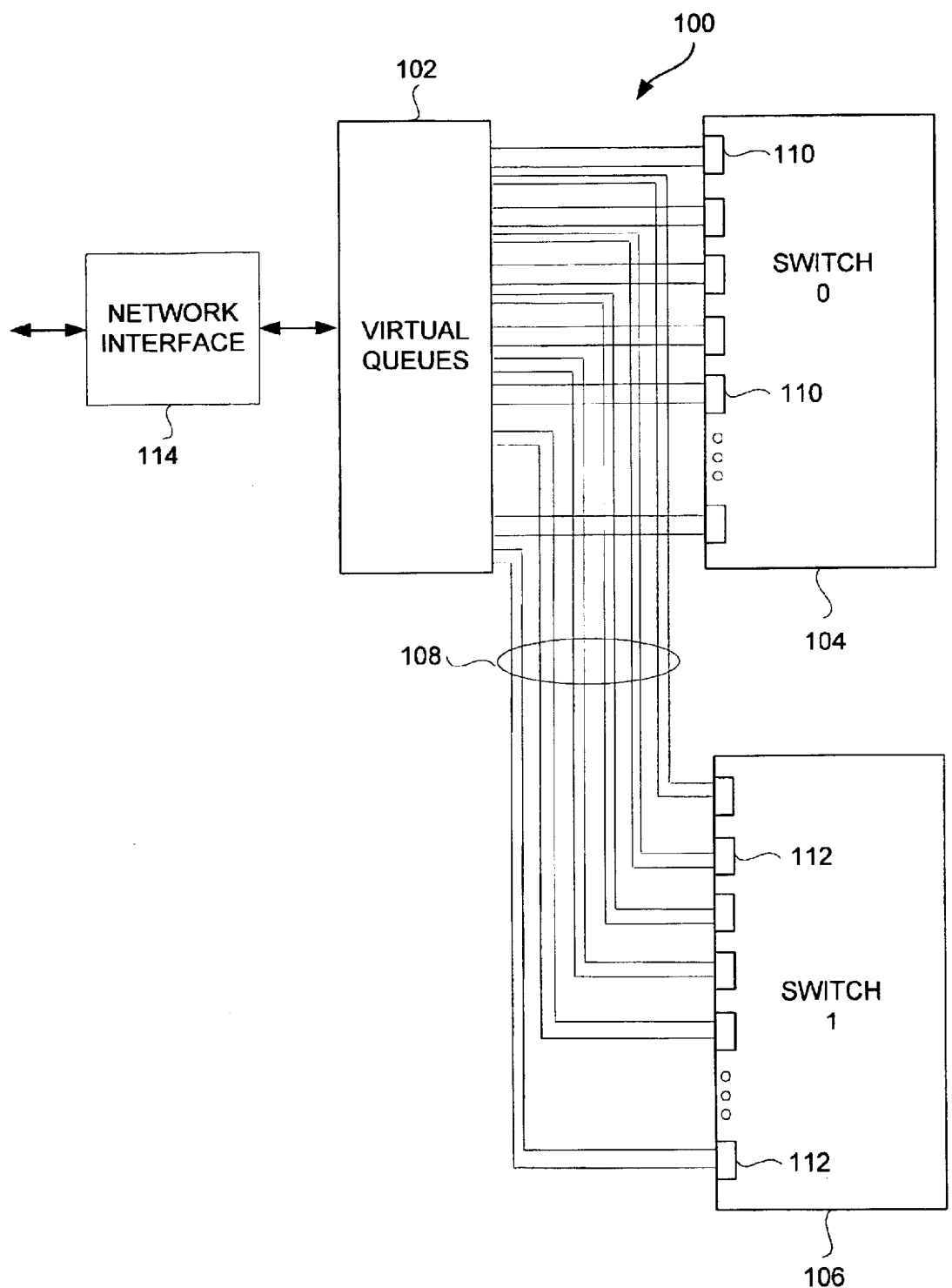
FIG. 1 is a block diagram of a switch system according to one embodiment of the invention.

FIG. 1 is a block diagram of a switch system 100 according to one embodiment of the invention. The switch system 100 includes virtual queues 102 and switches 104 and 106. The virtual queues 102 couple to the switches 104 and 106 through a plurality of links 108.

In this embodiment, the switches 104 and 106 together form a multi-port switch apparatus. The multi-port switch apparatus supports N ports. Since the multi-port switch apparatus includes two switches (e.g., switch chips), the N ports can be considered to be distributed across the switches 104 and 106. In other words, the switch 104 includes N partial ports 110 and the switch 106 includes N partial ports 112. Hence, since the N partial ports 110 are respectively associated with the N partial ports 112, they combine to yield the N ports.

Each of the N ports couples to a plurality of the links 108. In particular, in the embodiment of the invention shown in FIG. 1, each of the N ports couples to four (4) links 108. Each of the links 108 is also capable of high speed data transmission. Hence, providing the plurality of the links 108 to each port enables high speed data transfer between the virtual queues 102 and each of the ports of the multi-port switch apparatus 100. For example, with respect to the switch system 100 illustrated in FIG. 1, assume that there are sixteen ports (i.e., N=16) and that each port supports four (4) of the links 108. In such a case, the partial ports 110 of the switch 104 support two (2) links per port and the partial ports 112 of the switch 106 support two (2) links per port. In this example, the switches 104 and 106 are integrated circuit chips that each need to support thirty-two (32) links, each such link requires a pin (or external contact) of the integrated circuit chip (chip). Hence, with this example, the virtual queues 102 would also need to support sixty-four (64) links which may also require a multi-chip implementation. For example, the virtual queues 102 could be implemented by a single integrated circuit chip supporting sixty-four (64) links or could be implemented by two integrated circuit chips each supporting thirty-two (32) links.

In any event, the switch system 100 uses multiple switch chips to implement ports and also uses multiple links per port. Since integrated circuits are limited in the number of pins (external contacts) they can support, by using multiple switch chips not only can more ports can be supported but also each port can support more links. Hence, the combined effect of multiple switch chips and multiple links is significantly improved bandwidth for the switch system 100. For example, in the above example it each of the links 108 supports 2.5 Gbps data rate, each of the sixteen (16) ports is able to support a data rate of 10 Gbps.

The virtual queues 102 in turn can couple to a network through a network interface 108. The network interface 114 serves to couple the switch system 100 to one or more networks. The networks can vary widely and can include Local Area Networks, Wide Area Networks, or the Internet.

While the switch system 100 illustrated in FIG. 1 includes virtual queues 102 and the switches 104 and 106, the data transfer rate (or bandwidth) of the switch system 100 can be further improved by adding more switch chips and/or more links. However, since each chip of the switch system is constrained in the number of pins (external contacts) it can support, the number of links is not limitless. However, by use of multiple switch chips (and multiple virtual queue chips), the number of links supported can be increased and thus the number of high speed ports can also be increased.

Figure 2A:
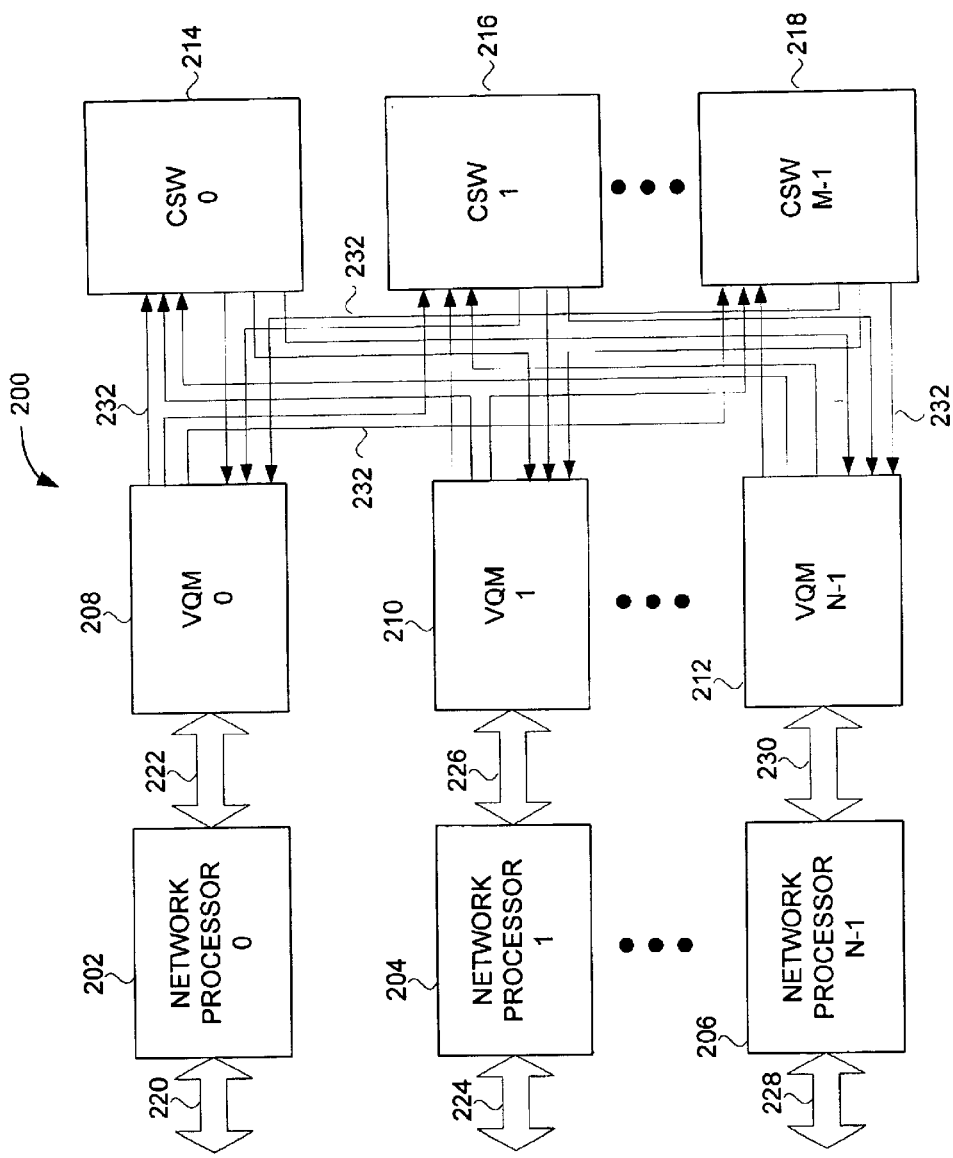
FIG. 2A is a block diagram of a switch system according to one embodiment of the invention.

FIG. 2A is a block diagram of a switch system 200 according to one embodiment of the invention. The switch system 200 can implement a switch fabric having multiple different configurations.

The switch system 200 includes network processors 202, 204 and 206. The network processor 202 couples to a network link through a network interface 220. The network processor 204 couples to a network link through a network interface 224. A network processor 206 couples to a network link through a network interface 228. The network processors 202, 204 and 206 receive packets of data via the corresponding network links and forward the packets to corresponding Virtual Queue Managers (VQMs). The Virtual Queue Managers operate to divide each of the packets into a plurality of fixed-length cells (blocks) and then operates to store (queue) the cells. More particularly, the switch system 200 includes Virtual Queue Managers (VQMs) 208, 210 and 212 for storing the cells. Each of the VQMs 208, 210 and 212 respectively correspond to the network processors 202, 204 and 206. The VQM 208 and the network processor 202 communicate over a queue interface 222, the VQM 210 and the network processor 204 communicate over a queue interface 226, and the VQM 212 and the network processor 206 communicate over a queue interface 230.

The VQMs 208, 210 and 212 operate to respectively store (queue) the cells incoming from the network processors 202, 204 and 206 as well as the cells outgoing to the network processors 202, 204 and 206. The switch system 200 also includes Concurrent Switches (CSWs) 214, 216 and 218. The concurrent switches provide the switching element for the switch system 200. In particular, the concurrent switches operate to couple an incoming port to an outgoing port. Specifically, each of the VQMs 208, 210 and 212 couple through links 232 to each of the CSWs 214, 216 and 218. In other words, each of the VQMs receives an incoming link from each of the CSWs 214, 216 and 218 as well as provides an output link 232 to each of the CSWs 214, 216 and 218. In practice, a single bi-directional link can pertain to the incoming link or the outgoing link. The bi-directional link can be parallel or serial, though presently serial is preferred because limitations on available pins.

The switch system 200 operates such that each of the CSWs 214, 216 and 218 is operating to switch in a synchronized manner. The switch system 200 is able to operate in a synchronized manner without having to provide a separate synchronization interface (e.g., lines, connections or links) between the concurrent switches. As will be discussed in more detail below, the switching system 200 includes one or more schedulers that are either external or internal to one or more of the CSWs 214, 216 and 218. In cases where an external scheduler is used, the switch system 200 is also able to operate in a synchronized manner without having to provide a separate synchronization interface (e.g., lines, connections or links) between the concurrent switches and the external scheduler. In either case, the scheduler provided within the switch system 200 sets a schedule that control which ports or links are utilized to switch data through the CSWs 214, 216 and 218. The synchronized switching by the CSWs 214, 216 and 218 is then in accordance with the schedule.

The switch system 200 includes N network processors, N Virtual Queue Managers (VQMs), and M Concurrent Switches (CSWs). The integer N represents the number of the separate Virtual Queue Manager (VQM) are used in the system, and the integer M represents the number of the separate Concurrent Switch (CSW) are used in the system. In one embodiment, each of these Virtual Queue Manager (VQM) or Concurrent Switch (CSW) is a separately packaged integrated circuit chip. Typically, the number of pins associated with integrated circuit chips is limited, and thus the maximum number that the integers M and N can take are often limited. The switch system 200 can implement a switch having multiple different configurations.

In accordance with one implementation of the invention, the switch system 200 can easily implement a OC-192 (10 Gbps per port) 32×32 (i.e., 32 ports) switch fabric. In such a configuration, N=32 such that there are thirty-two Virtual Queue Managers (VQMs) and M=8 such that there are eight Concurrent Switches (CSWs). In accordance with another implementation, the switch system 200 can easily implement a OC-768 (40 Gbps per port) 32×32 (i.e., 32 ports) switch fabric. In such a configuration, N=32 such that there are thirty-two Virtual Queue Managers (VQMs) and M=32 such that there are thirty-two Concurrent Switches (CSWs). With today's technology, the concurrent switches typically can only support up to 32 links, and thus the integer N can be limited to 32. However, technology continues to evolve and various companies are currently developing switch chips that are able to support more than 32 links. It is expected that concurrent switches will soon be able to support 64 and 128 links. It is also expected that virtual queue managers will soon be able to support 64 and 128 links. Although the switch system 200 is depicted as having N network processors, N Virtual Queue Managers (VQMs) and M Concurrent Switches (CSWs), it should be note that the number of these respective components need not be the same but could vary.

Figure 2B:
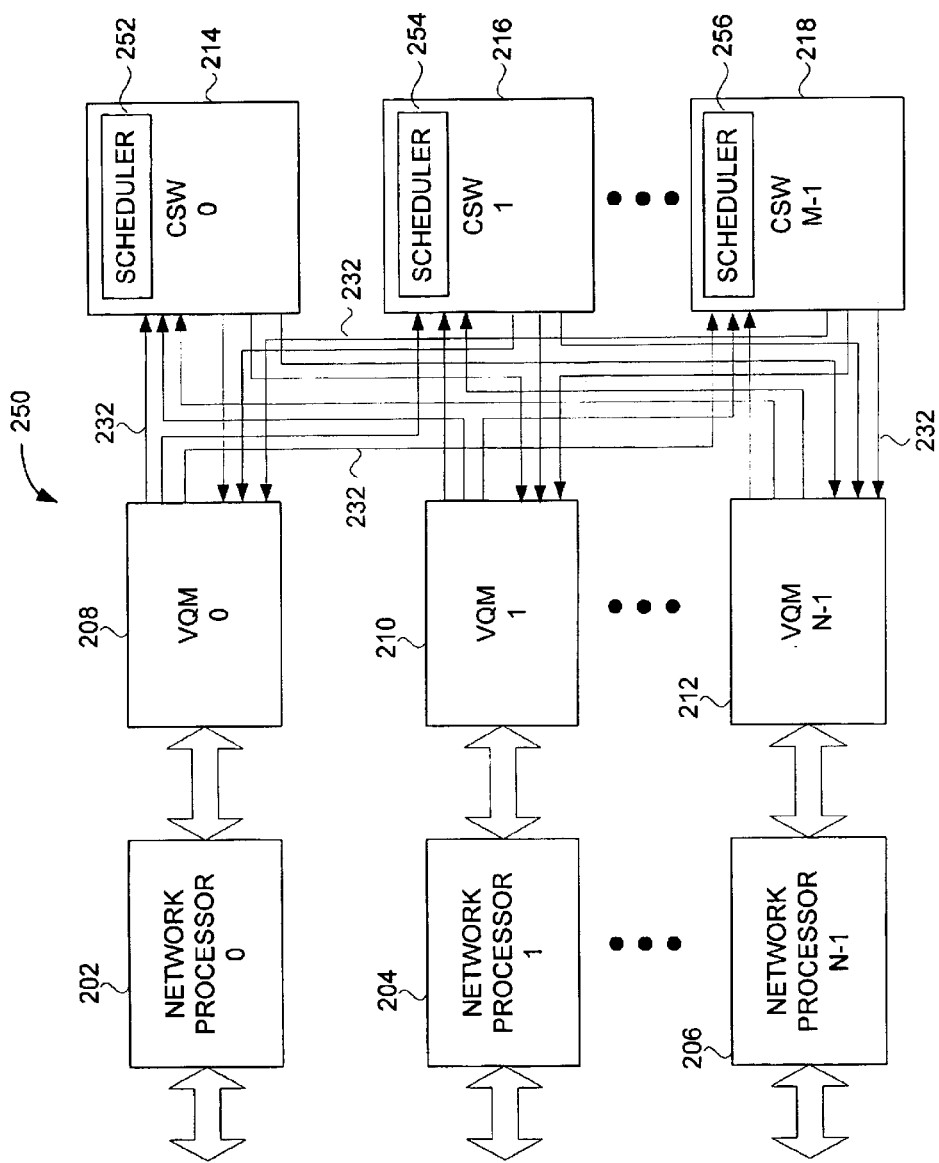
FIG. 2B is a block diagram of a switch system according to another embodiment of the invention.

FIG. 2B is a block diagram of a switch system 250 according to another embodiment of the invention. The switch system 250 includes a scheduler within each of the Concurrent Switches (CSWs). More particularly, the CSW 214 includes a scheduler 252, the CSW 216 includes a scheduler 254, and the CSW 218 includes a scheduler 256. In this embodiment, each of the concurrent switches includes an internal scheduler that can independently make the switching action determination. More particularly, each of the schedulers 252, 254 and 256 separately but identically evaluate requests from each of the VQMs 208, 210 and 212 and then generate the appropriate grants back to the VQMs 208, 210 and 212. Hence, this embodiment also supports additional links because by not having to support communication links with a scheduler for the same reasons as the embodiment discussed above in FIG. 2B. Yet, since each of the concurrent switches includes a scheduler, this embodiment does not need to provide the switch control information that is, for example, utilized with respect to the embodiment discussed above in FIG. 2C below. Here, each scheduler 252, 254 and 256 would independently provide the needed switch configuration control for its associated Concurrent Switch. The schedulers 252, 254 and 256 operate in a synchronized manner such that they each perform a switching action at the same time. In one implementation, the synchronization can be achieved in accordance with a Start of Cell (SoC) field/bit within the cells being switched.

Figure 2C:
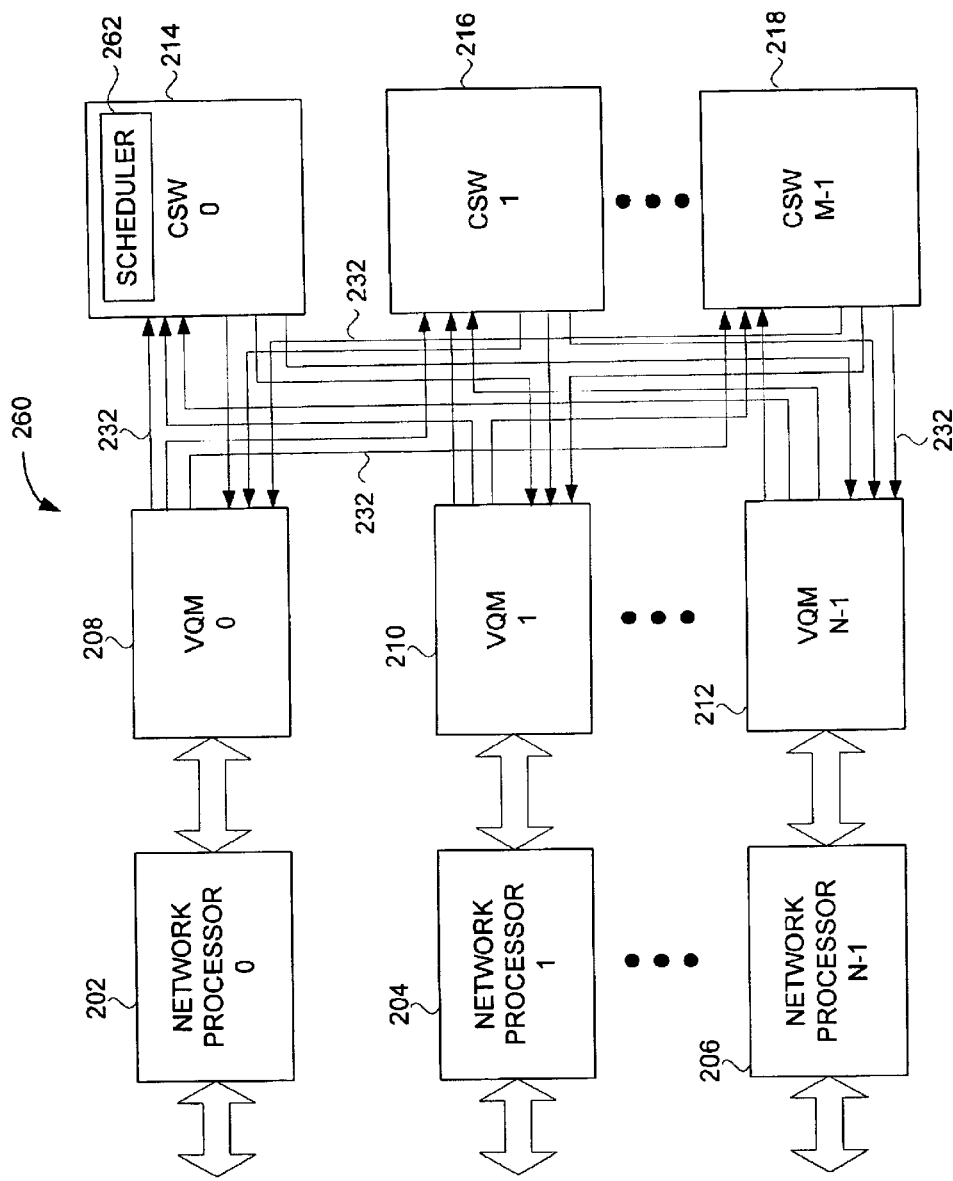
FIG. 2C is a block diagram of a switch system according to another embodiment of the invention.

FIG. 2C is a block diagram of a switch system 260 according to another embodiment of the invention. The switch system 260 is configured as is the switch system 200 illustrated in FIG. 2A. However, the switch system 260 provides a scheduler 262 within the Concurrent Switch (CSW) 214. The CSWs 216 and 218 are not provided with an operable scheduler. The CSW 214 can be considered a primary concurrent switch since it includes a scheduler, and the CSWs 216 and 218 can be considered auxiliary concurrent switches.

The scheduler 262 operates to schedule the switching within each of the concurrent switches (CSWs) 214, 216 and 218. More particularly, each of the Virtual Queue Managers (VQMs) 208, 210 and 212 make requests (via the links 232 coupled to the CSW 214) to the scheduler 262 to be able to send cells that they are storing to the CSWs 214, 216 and 218. The scheduler 262 then grants one or more of the requests and so informs the VQMs 208, 210 and 212. Thereafter, based on the grants, one or more of the VQMs 208, 210 and 212 can transfer one or more cells stored therein to one or more of the CSWs 214, 216 and 218. Further, since the scheduler 262 does not include dedicated communication links to the CSWs 216 and 218 (which lack an operable scheduler), the CSWs 214, 216 and 218 have additional capacity to support more links 232. For example, the CSWs 214, 216 and 216 are separate integrated circuits and by not having to support communication links with a scheduler, additional pins (external contacts) are available for the VQM-CSW links (e.g., links 232). As a result, switch system 100 can support greater bandwidths. In other words, each concurrent switch is able to support more links and thus more concurrent switches can be supported (i.e., the depth—the value of the integer N—can be increased).

However, since the switching must be synchronized, the scheduler 252 needs to inform at least the remaining CSWs 216 and 218 of the switching action to be performed. According to the switch system 250, the scheduler 252 includes switch control information (e.g., a grant bitmap or a destination identifier) with the grants it returns to the virtual queue managers (e.g., at least VQM 214 and 216). The virtual queue managers can then direct the switch control information to the associated concurrent switches so that the concurrent switches can configure themselves appropriately.

In this embodiment, the remaining CSWs 216 and 218 do not need to include schedulers. However, if the other remaining CSWs 216 and 218 were to include schedulers, such schedulers would normally be inactive or idle. One advantage of having at least one additional scheduler is that its available for back-up should the primary scheduler (e.g., scheduler 252) fail. In other words, the additional schedulers, if provided, provide fault tolerance for the switch system.

Figure 2D:
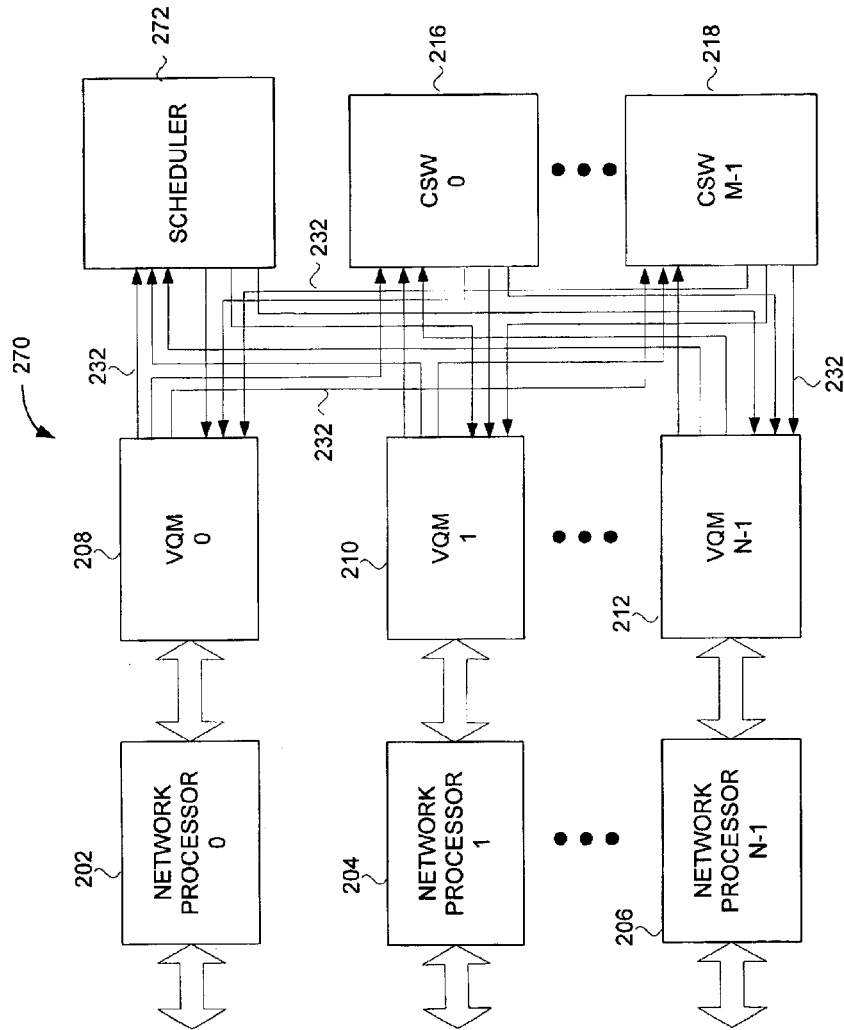
FIG. 2D is a block diagram of a switch system according to still another embodiment of the invention.

FIG. 2D is a block diagram of a switch system 270 according to still another embodiment of the invention. In the switch system 270, a separate, external scheduler 272 is provided. Hence, in this embodiment, the scheduler 272 is a separate integrated circuit chip that couples to each of the VQMs 208, 210 and 212 over the links 232 so as to provide centralized scheduling. The switch system 270 operates very similar to the switch system 250 illustrated in FIG. 2B. However, the switch system 270 is able to support one less concurrent switch since the scheduler 272 consumes some of the links that would otherwise be able to support an additional concurrent switch.

Current port speeds for routers is in accordance with OC-192. OC-192 is a standard that specifies, among other things, that the bandwidth to be supported is 10 Gbps per port. Current technology is 2.5 Gbps per link. Application of the invention can easily yields a 8×8 (i.e., 8 port) OC-192 compliant switch. To provide the 10 Gbps rate on each port, four links can be grouped for each port. OC-48 is another standard that requires a bandwidth of 2.5 Gbps per port to be supported. At this rate, application of the invention can easily yield a 32×32 (i.e., 32 port) OC-48 compliant switch. As concurrent switch chips (being developed) are able to support more than 32 links, the application of the invention can support even greater bandwidths (e.g., 32×32 (i.e., 32 port) OC-192 and well beyond. With multiple switch chips (e.g., concurrent switches), each of the links within a group for a port can couple to a different concurrent switch.

Figure 2E:
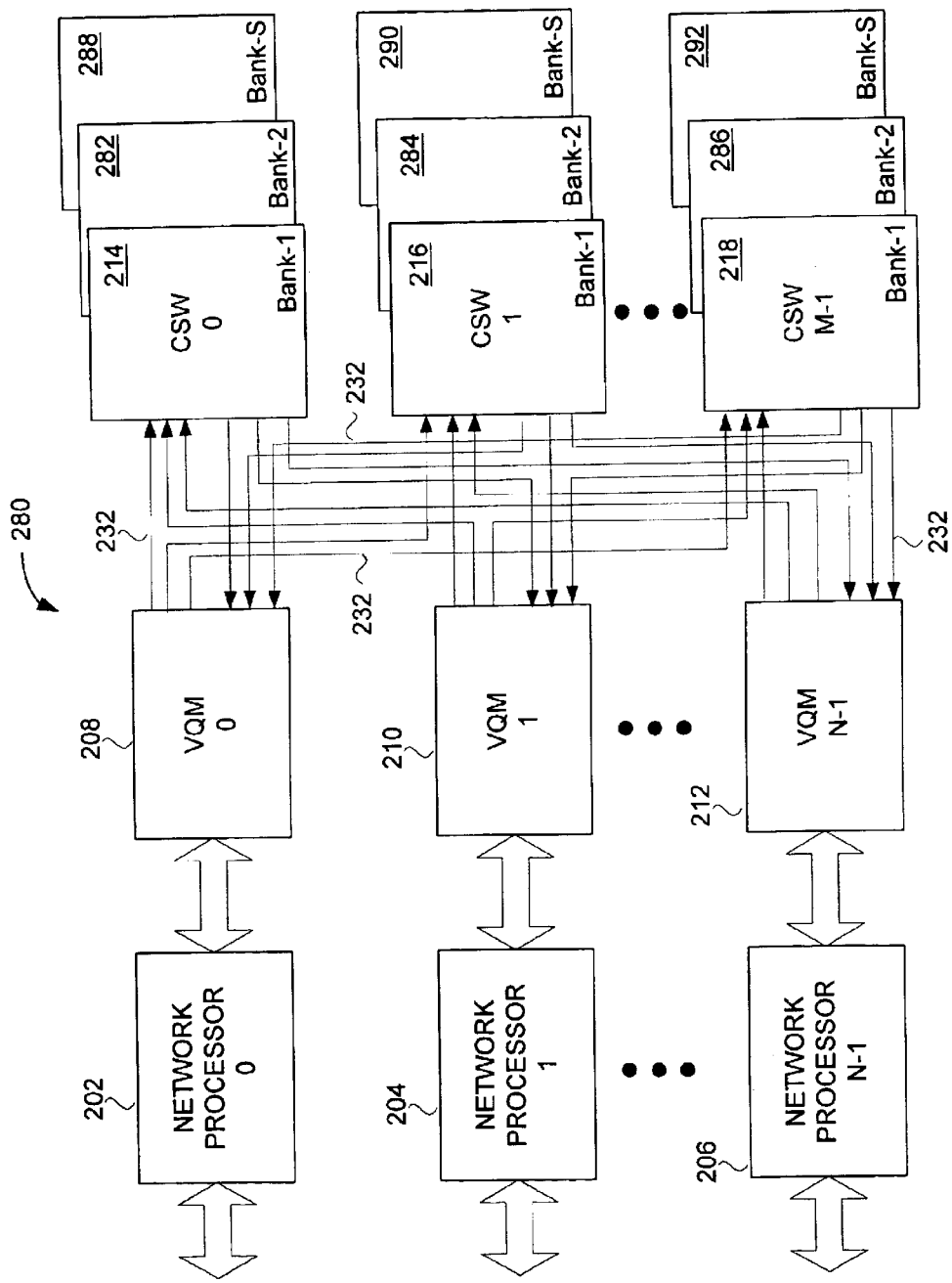
FIG. 2E is a block diagram of a switch system according to yet still another embodiment of the invention.

In general, the invention is scalable to support very high bandwidths. In FIGS. 2A–2D, the switch systems according to the invention can be scaled by increasing the number of virtual queues or concurrent switches. FIG. 2E is a block diagram of a switch system 280 according to yet still another embodiment of the invention. The switch system 280 is similar to the switch system 200 illustrated in FIG. 2A but further includes one or more banks of Concurrent Switches (CSWs). For example, the switch system 280 shown in FIG. 2E reflects that it can be expanded to include S banks, where S is an integer. More particularly, as shown in FIG. 2E, a first bank includes the CSWs 214, 216, ..., 218 as was the case in FIG. 2A, a second bank includes CSWs 282, 284, ..., 286, and the Sth bank includes CSWs 288, 290, ..., 292. One or more additional banks can be added to a switch system in this manner to thereby scale the switch system. Each of the CSWs within the additional banks separately couple to the VQMs 208, 210, ..., 212 through the links 232. Hence, the VQMs need to support more links 232 when additional banks are added. The scaling through different banks can be used alone or in combination with the scaling by increasing the number of virtual queues or concurrent switches. Although FIG. 2E resembles FIG. 2A, additional banks can similarly be added to the embodiments of the switch systems shown in FIGS. 2B–2D.

FIG. 3 is a block diagram of a Virtual Queue Manager 300 according to one embodiment of the invention. The Virtual Queue Manager 300 can, for example, represent any of the Virtual Queue Managers (VQMs) 208, 210 and 212 illustrated in FIGS. 2A–2D.

The Virtual Queue Manager 300 has a transmit side and a receive side. The transmit side receives an incoming packet (frame) from a network processor, divides the packet into cells (blocks) and stores the cells in virtual queue, and thereafter transmits the cells as scheduled to a Concurrent Switches (CSWs) via links. More particularly, the transmit side of the Virtual Queue Manager 300 includes an Ingress Frame Processor (IFP) 302, a Virtual Output Queue (VOQ) 304, and Cell Transmitting Units (CTUs) 306. The Ingress Frame Processor 302 operates to segment incoming frames into cells (blocks). The Virtual Output Queue 304 receives the cells from the Ingress Frame Processor 302 and temporarily stores the cells for eventual transmission. The Cell Transmitting Units 306 operate to transmit cells stored in the Virtual Output Queue 304 over a plurality of links 308 to one or more Concurrent Switches. In the embodiment shown in FIG. 3, the Virtual Queue Manager 300 includes thirty-two (32) bi-directional links. The links 308 couple to Concurrent Switches (CSWs). One or more of the links destined for each Concurrent witch (CSW) can be grouped to represents a port as discussed in more detail below.

The receive side of the Virtual Queue Manager 300 includes Cell Receiving Units (CRUs) 312, a Virtual Input Queue (VIQ) 314, and an Egress Frame Processor (EFP) 316. The links 308 also couple to Cell Receiving Units (CRUs) 312 that receive incoming cells over the links 308 from the Concurrent Switches (CSWs). The incoming cells are then stored in the Virtual Input Queue (VIQ) 314. Then, the Egress Frame Processor (EFP) 316 assembles the cells stored in the VIQ 314 into an outgoing packet (frame) that are directed to a network processor.

Although the Virtual Queue Manager (VQM) 300 illustrated in FIG. 3 indicates a single queue for each transmit and receive side, it should be understood that the number of queues actually or virtually used can vary. For example, each port can be supported by virtual queue. As another example, each link can be supported by a virtual queue. As another example, multiple queues can be provided to segregate different priority levels.

FIG. 4 is a block diagram of a Concurrent Switch 400 according to one embodiment of the invention. The Concurrent switch 400 can, for example, represent the Concurrent switches (CSWs) that include a scheduler as illustrated in FIGS. 2B and 2C. As noted above, other Concurrent Switches can be designed without a scheduler.

The Concurrent Switch 400 includes a plurality of links 402. With respect to the particular embodiment shown in FIG. 4, the Concurrent Switch 400 supports thirty-two (32) bi-directional links. The links 402 typically couple to the links (e.g., links 308) of various Virtual Queue Managers. For each link 402, the Concurrent Switch 400 includes a data receiving unit (RXU) 404 as well as a data transmitting unit (TXU) 406. When receiving a cell (block) over one or more of the links 402, one or more of the data receiving units 404 directs a header portion of the cell to a scheduler (SCH) 408 and directs a payload portion (payload and payload header) to a crossbar (CBAR) 410. The header portion directed to the scheduler 408 may include a request from an associated Virtual Queue Manager. Hence, the scheduler 408 may produce a grant to one or more incoming requests. The crossbar 410 is configured in accordance with destination or configuration information supplied within the payload portion. The output of the crossbar 410 is the switched payload. Then, one or more of the data transmitting units 406 form a cell having a header portion provided by the scheduler 408 and a payload portion provided by the crossbar 410. Here, the header portion can include a grant in response to the one or more incoming requests.

Figure 5:
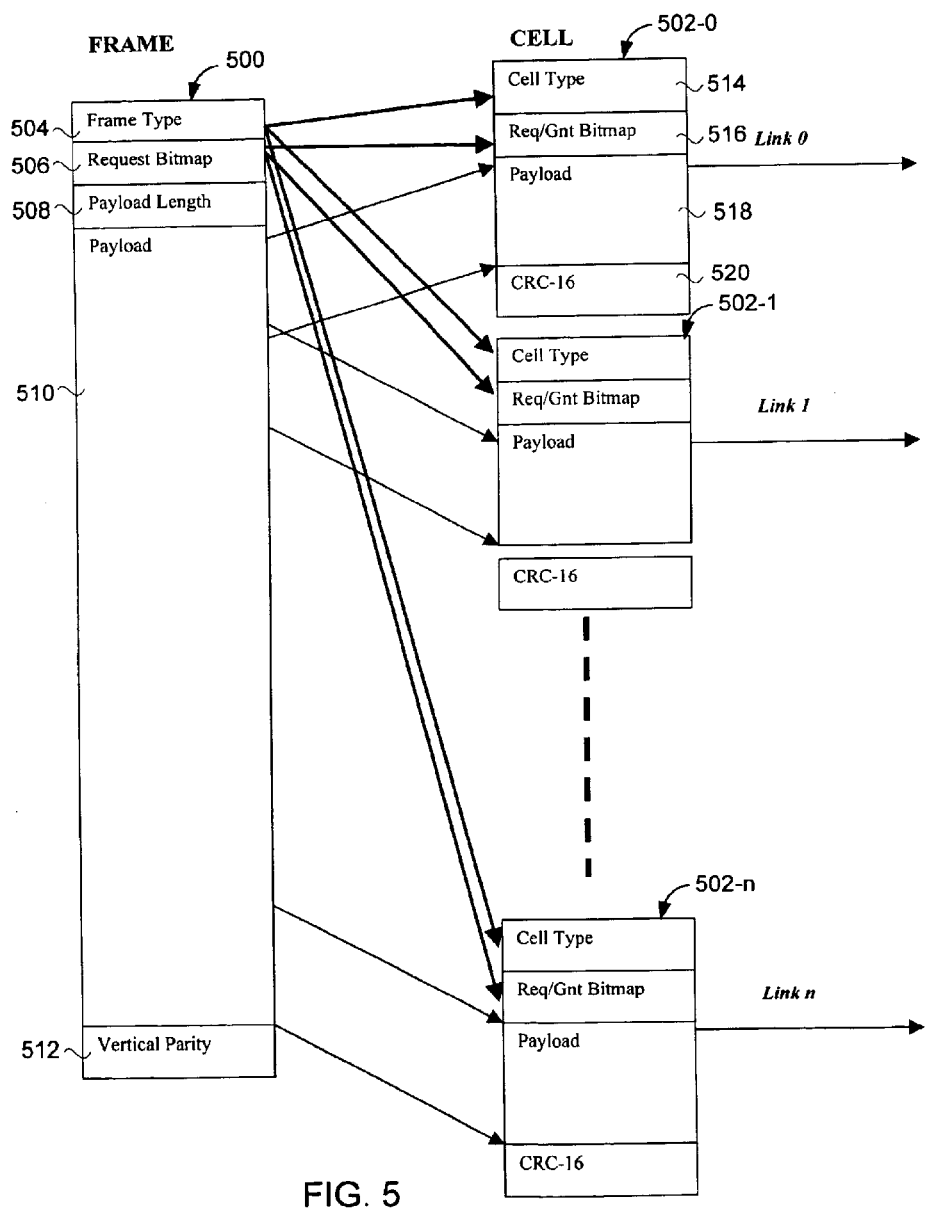
FIG. 5 is a diagram illustrating frame-to-cell translation according to one embodiment of the invention.

FIG. 5 is a diagram illustrating frame-to-cell translation according to one embodiment of the invention. An incoming frame 500 is converted into a plurality of cells 502 (502-0, . . . , 502-n). The size of the cells is fixed but can, if desired, vary as the frame size varies. In one embodiment, a virtual queue manager, such as the virtual queue manager 300 illustrated in FIG. 3, can perform the frame-to-cell translation. The cells can also be referred to as blocks, as one or more blocks can represent a cell.

The frame 500 includes a frame type 504, a request bitmap 506, a payload length 508, a payload 510, and a vertical parity 512. The frame type 504 and the request bitmap 506 form a header. The cells 502 each include a cell control header (CCH) that includes primarily a cell type 514 and a request/grant bitmap 516. The cells also each include a payload 518 and a cyclic redundancy check (CRC) 520. The frame-to-cell translation forms the CCH from the header of the frame 500, and forms the CRC from the vertical parity 512, and further forms the payload 518 for the cell 502 from the payload 510 of the frame 500. The frame-to-cell translation can be performed without adding any overhead.

A representative CCH is described below in Tables I and II. The representative CCH in Table I pertains to the CCH used from a virtual queue manager to a concurrent switch, and the representative CCH in Table II pertains to the CCH used from a concurrent switch to a virtual queue manager.

TABLE I

CCH (VQM to CSWs)

| Field Name | Description |
| --- | --- |
| Ctype | 00 = Idle, 01=Unicast Request, 10=Multicast Request, 11=Backpressure |
| Class | QoS class or Request priority |
| Bitmap | Request bitmap from VOQ (one bit per port/queue) |
| SOF | Start-of-Frame (associated with payload) |
| Main | Main/Aux. link |

TABLE II

CCH (CSWs to VQM)

| Field Name | Description |
| --- | --- |
| Ctype | 00 = Idle, 01=Unicast Grant, 10=Multicast Grant, 11=reserved |
| Class | QoS class or Request priority |
| Bitmap | Grant bitmap for VOQ (one bit per port/queue) |
| SOF | Start-of-Frame (associated with payload) |
| Main | Main/Aux. link |

As noted above, the cell format can have different formats. In particular, the cells can use either a primary (main) format or an auxiliary format. The primary format has a larger header so that requests/grants can be exchanged. On the other hand, the auxiliary format is able carry a greater payload since the size of the header is reduced with this format.

Table III provides representative cell format that can be used on the interface between a virtual queue manager and concurrent switch.

TABLE III

Cell Format

| Field Name | Description |
|---|---|
| SOC | Start-Of-Cell |
| CCH | Cell Control Header (see Table I or II) |
| CRC | Cyclic Redundancy Check |
| CPD | Payload Header |
| CPL | Cell Payload |

As a representative example, Start Of Cell (SOC) use 1 bit per clock, Cell Control Header (CCH) is 16 bits (plus 32-bit request/grant bitmap if it is primary block), Cyclic Redundancy Check (CRC) uses 16 bits, and the payload header (CPD) is 5 bits (which can support up to 32 ports). In general, the request bitmap is used to make switching requests to a scheduler, and the grant bitmap is used to return an indication of the granting of requests to virtual queues. In one implementation, as here, request and grants are conveyed with bitmaps where each bit in a bitmap can represent a different port. The payload header (CPD) identifies the destination for the payload as granted by a scheduler. The payload header (CPD) is used to configure a concurrent switch to perform a particular switching operation. In the representative example, the cell/block size is 36 bytes (9 bits over 32 cycles) per link excluding SOC bit. Hence, the primary block contains 6 bytes CCH (with bitmap), 2 bytes CRC, 28 bytes cell payload (CPL) (including CPD). Alternatively, the auxiliary block contains 2 bytes CCH (without bitmap), 2 bytes CRC, 32 bytes cell payload (CPL) (including CPD). The auxiliary block format does not need the request/grant bitmap for scheduler, hence it saves 4 bytes for payload.

Further, it is assumed that each cell is transferred within K clock cycles, integer K is the number of cycles that scheduler can finish payload scheduling, and transfer control header with enough payload between a virtual queue manager and a concurrent switch. In one embodiment, K=32, though various other arrangements can be used.

Figure 6:
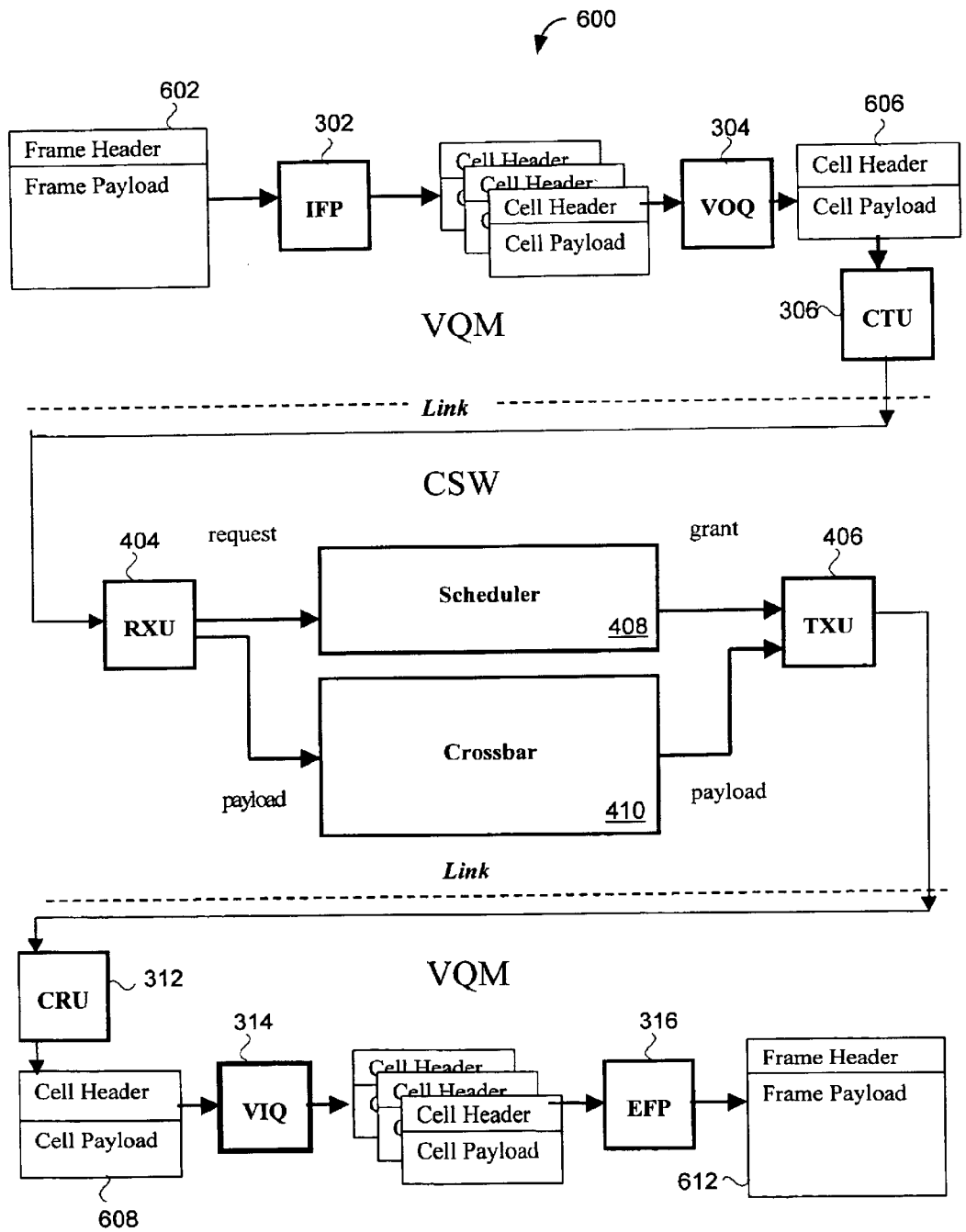
FIG. 6 illustrates a diagram of data flow for a switch system according to one embodiment of the invention.

FIG. 6 illustrates a diagram of data flow 600 for a switch system according to one embodiment of the invention. The data flow 600 pertains to the flow of data with respect to a single virtual queue manager and a single concurrent switch (namely, the virtual queue manager 300 and the concurrent switch 400 of FIGS. 3 and 4, respectively).

The data flow 600 begins when a frame 602 is received. The frame 10 602 includes a frame header and a frame payload. The frame 602 is processed by the IFP 302 and/or the VOQ 304 to produce a plurality of cells 606. Each of the cells 606 has a cell header and a cell payload. The cells 606 are stored in the VOQ 304 until they can be transferred to the CSWs. Once a cell 606 is to be transmitted, the cell 606 is retrieved from the VOQ 304 and supplied to the CTU 306 which transmits the cells over a link (e.g., input port) to an appropriate concurrent switch, namely the CSW 400. The receiving unit 404 of the CSW 400 receives the cell 606 that has been transmitted. At least a request portion (e.g., request bitmap) of the header of the received cell is then supplied to the scheduler 408, and the payload of the received cell is supplied to the crossbar 410. The scheduler 408 produces a grant (e.g., grant bitmap), and the crossbar 410 produces outgoing payload. The TXU 406 then combines the grant and the outgoing payload into an outgoing cell 608 and transmits the outgoing cell 608 over a link (e.g., output port). The VQM 300 associated with the output port receives the outgoing cell 608 at the CRU 302. The outgoing cell 608 is then supplied to the VIQ 314. Once a plurality of outgoing cells 610 of a frame are stored in the VIQ 314, the EFP 316 can form a frame 612 from the plurality of outgoing cells. Thus, a frame has been received at the input port and switched so that it is output on the output port.

Figure 7:
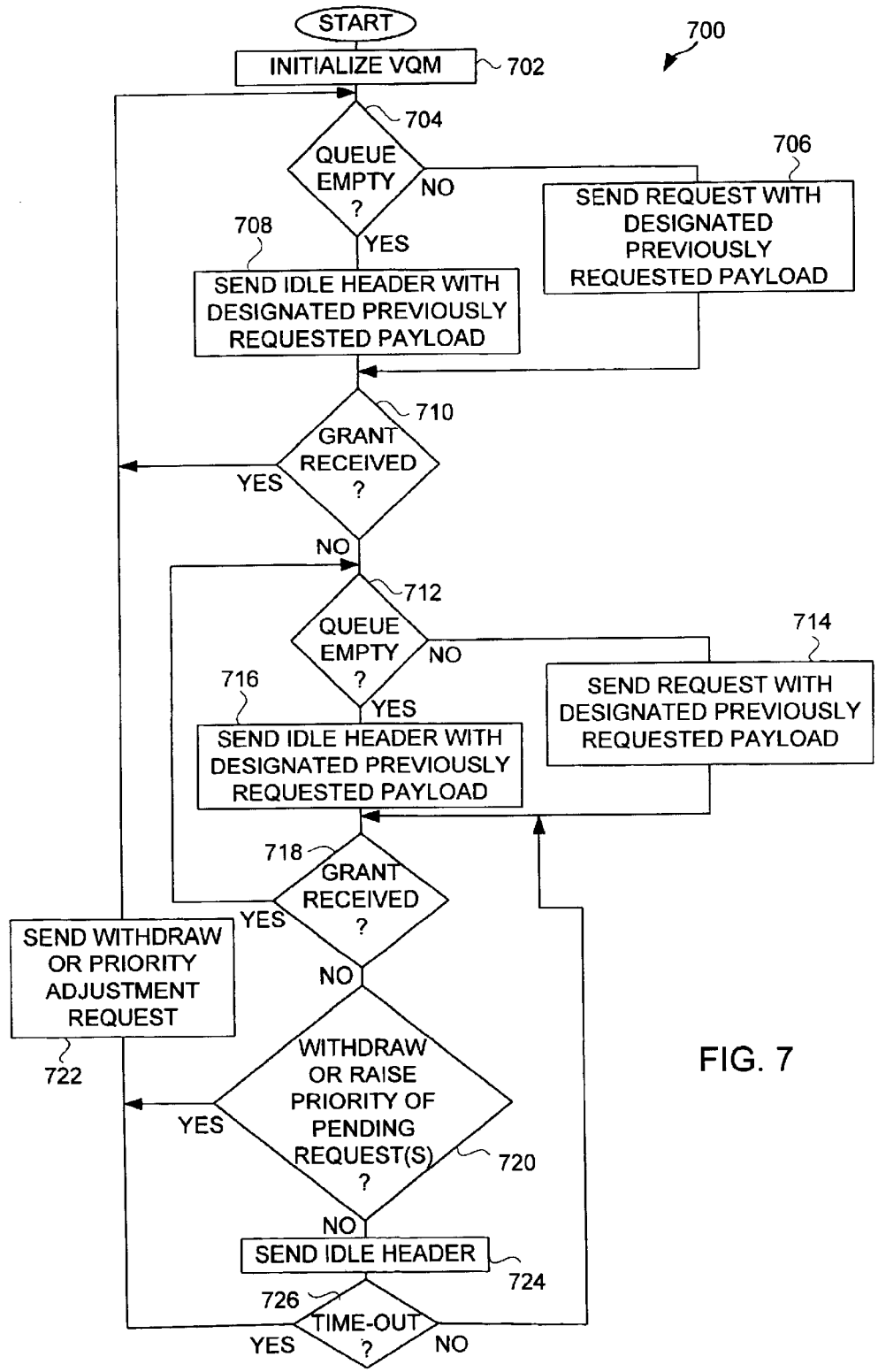
FIG. 7 is a flow diagram of virtual queue manager processing according to one embodiment of the invention.

FIG. 7 is a flow diagram of virtual queue manager (VQM) processing 700 according to one embodiment of the invention. The VQM processing 700 is, for example, performed by a virtual queue manager, such as the virtual queue manager 300 illustrated in FIG. 3. Typically, the virtual queue manager provides at least one output queue and at least one input queue.

The VQM processing 700 initially initializes 702 a virtual queue manager (VQM). Then, a decision 704 determines whether an output queue is empty. For example, with respect to FIG. 3, the decision 704 determines whether the Virtual Output Queue (VOQ) 304 is empty (i.e., whether any requests to be processed are in the queue). When the decision 704 determines that the queue is not empty, then a request together with a designated previously requested payload is sent 706. On the other hand, when the decision 704 determines that the queue is empty, then an idle header with a designated previously requested payload is instead sent 708. Following the operations 706 or 708, a decision 710 determines whether a grant has been received at the virtual queue manager. When a grant is received, the grant is received by an output queue. A grant is associated with a prior request and represents an indication of the extent to which the prior request is permitted. In other words, a grant serves to designate previously requested payload for transmission (e.g., to switch). For example, with respect to FIG. 3, the Cell Receiving Unit (CRU) 312 can receive the grant and direct it to the Virtual Output Queue (VOQ) 304. Further, any payload(s) being received by the Virtual Queue Manager (VQM) are received by the input queue. The received payload at the input queue (e.g., VIQ 314) is stored (queued) according to the payload header (e.g., cell payload source ID). For example, with respect to FIG. 3, the payload(s) can be received by one or more of the Cell Receiving Units (CRUs) 312 and then stored to the Virtual Input Queue (VIQ) 314.

When the decision 710 determines that a grant has been received, then the VQM processing 700 designates its requested payload (i.e., payload associated with the request that has been granted) for transmission and returns to repeat the decision 704 and subsequent operations so that additional requests and/or payloads can be sent (i.e., operations 706 and 708). For example, with respect to FIG. 3, the VOQ 304 receives a grant and puts its requested payload (e.g., cell or blocks) out to one or more of the Cell Transmitting Units (CTUs) 306 for transmission.

Alternatively, when the decision 710 determines that a grant has not been received, then a decision 712 determines whether the output queue is empty. When the decision 712 determines that the queue is not empty, then a request together with a designated previously requested payload is sent 714. On the other hand, when the decision 704 determines that the queue is empty, then an idle header with a designated previously requested payload is instead sent 716. Following the operations 714 or 716, a decision 718 determines whether a grant has been received at the virtual queue manager. As noted above, a grant serves to designate previously requested payload for transmission (e.g., to switch). When a grant is received, the grant is received by the output queue. Further, any payload(s) being received by the Virtual Queue Manager (VQM) are received by the input queue.

The received payload at the input queue is stored (queued) according to the payload header (e.g., cell payload source ID). When the decision 718 determines that a grant has been received, then the VQM processing 700 designates its requested payload (i.e., payload associated with the request that has been granted) for transmission and returns to repeat the decision 712 and subsequent operations so that additional requests and/or payloads can be sent (i.e., operations 714 and 716).

Alternatively, when the decision 718 determines that a grant has not been received, then a decision 720 determines whether the pending requests should be withdrawn (eliminated) or have their priority raised. The granting of requests are controlled by a scheduler that arbitrates amongst a plurality of incoming requests associated with the various ports and decides which one or more of the requests to grant. The arbitration typically takes priority levels into consideration. When the decision 720 determines that one or more of the pending request should be withdrawn or have their priority raised, then the VQM processing 700 a withdraw or priority adjustment request is sent 722. Following the operation 722, the VQM processing 700 returns to repeat the decision 704 and subsequent operations. .

On the other hand, when the decision 720 determines that the pending requests are to be withdrawn or have their priority raised, then an idle header is sent 724. Here, there are already two (2) pending requests waiting to be granted, so additional requests are not sent (even if were available in the output queue). Instead, an idle header is sent in place of a request. The idle header indicates to the scheduler that the corresponding port presently has no more requests for data transfer.

Next, a decision 726 determines whether a time-out has occurred. The time-out represents a limit on the amount of time to wait for a grant to be received. When the decision 726 determines that a time-out has not yet occurred, then the VQM processing 700 returns to repeat the decision 718. On the other hand, when the decision 726 determines that the idle condition has timed-out, then the VQM processing 700 returns to repeat the decision 704 via the operation 722. In one embodiment, each request can have its own time-out timer.

Figure 8:
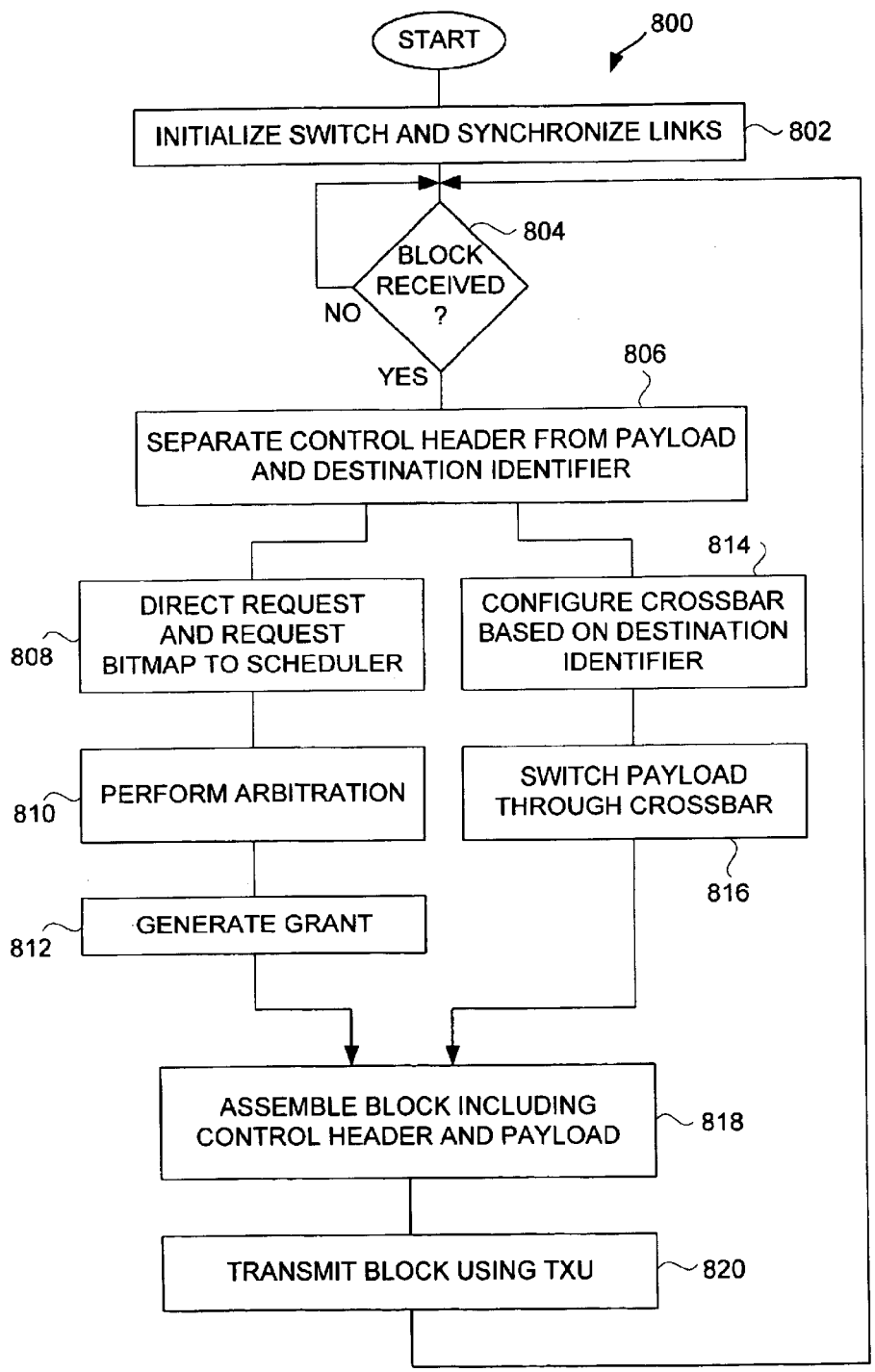
FIG. 8 is a flow diagram of concurrent switch processing according to one embodiment of the invention.

FIG. 8 is a flow diagram of Concurrent Switch processing 800 according to one embodiment of the invention. The switch processing 800 is for example, performed by a switch, such as the concurrent switch 400 illustrated in FIG. 4.

The switch processing 800 initializes 802 the switch and synchronizes its links. Next, a decision 804 determines whether a block has been received on an incoming port (source port). For example, in the case of the concurrent switch 400 illustrated in FIG. 4, the block can be received at a receiving unit (RXU). When the decision 804 determines that a block is not yet been received, then the switch processing 800 awaits reception of such a block.

Once the decision 804 determines that a block has been received, then the block is processed as follows. A block includes a control header and a payload. The control header is, for example, the Cell control Header (CCH) described above. The payload is the data that is to be transported through the switch. Once a block has been received, the control header is separated 806 from the payload and its payload header (e.g., including a destination identifier) that forms part of the payload. The control header includes at least a request and a request bit map. The request and the request bit map are directed 808 to a scheduler associated with the switch. The scheduler, for example, can be the scheduler 410 illustrated in FIG. 4. Arbitration is then performed 810 to determine which of various requests that have been received should be granted. The arbitration is typically performed by the scheduler. Following the arbitration, a grant is generated 812.

While operations 808–812 are being performed, a crossbar (more generally, switch) is configured 814 based on the destination identifier. The destination identifier is provided within or derived from the payload header. For example, the crossbar can be the crossbar 408 illustrated in FIG. 4. After the crossbar has been configured 814, the payload is switched 816 through the crossbar.

Following operations 812 and 816, an outgoing block is assembled 818. The outgoing block includes a control header and payload. Then, the block is transmitted 820 to an outgoing port (destination port). For example, in the case of the concurrent switch 400 illustrated in FIG. 4, the block can be transmitted at a transmission unit (TXU).

Although the switch processing 800 is largely described with respect to processing of a single block provided over a single link, the switch can also simultaneously process a plurality of blocks received over different links provided no conflicts within the crossbar and provided different output links are used.

The switch system according to the invention supports multiple ports. Hence, incoming packets on any of the ports to be switched by the switch system to any of the ports. Further, the incoming packets to a port can be output to one or multiple ports. Unicast refers to the situation where incoming packets to a port are to be output to a single port. Multicast refers to the situation where incoming packets to a port are to be output to multiple ports.

A simplified example of the invention in which the switch system supports four ports and in which the switching protocol uses multiple cycles to provide synchronized switching operations is provided in Tables IV and V below. Table IV represents three different requests R1 concurrently issued from ports 0, 2 and 3, respectively. The request R1 at port 0 is requesting to switch data incoming to port 0 to each of ports 2 and 3. The request R1 at port 2 is requesting to switch data incoming to port 2 to port 1. The request R1 at port 3 is requesting to switch data incoming to port 3 to port 0. The port 1 is not issuing a concurrent request in this example.

TABLE IV

| Request | Source Port | Destination Port |
| --- | --- | --- |
| R1 (0->2,3) | 0 | 2,3 |
| R1 (2->1) | 2 | 1 |
| R1 (3->0) | 3 | 0 |

Table V contains an example of the protocol used to switch data through the switch system when processing the simplified example having requests R1 from three ports as shown in Table IV. The protocol uses multiple cycles to switch data through the switch system. In general, the protocol can be considered to be performed over four (4) cycles, where a cycle represents a predetermined number of clock pulses. Table V illustrates four (4) cycles used in processing the requests R1.

TABLE V

|  | Cycle: 1 | Cycle: 2 | Cycle: 3 | Cycle: 4 | Cycle: 5 |
|---|---|---|---|---|---|
| Port 0 | R1(0->2,3) | — | TD1(0->2) | TD1(0->3) | — |
|  | — | G1(0->2) | G1(0->3) | RD1(3->0) | — |
| Port 1 | — | — | — | — | — |
|  | — | — | — | RD1(2->1) | — |
| Port 2 | R1(2->1) | — | TD1(2->1) | — | — |
|  | — | G1(2->1) | — | RD1(0->2) | — |
| Port 3 | R1(3->0) | — | TD1(3->0) | — | — |
|  | — | G1(3->0) | — | — | RD1(0->3) |

As indicated in Table V, the three requests R1 are concurrently issued in cycle 1, and then a scheduler within the switch system determines which of the requests R1 can be granted. Then, in cycle 2, grants G1 are returned by the scheduler to ports 0, 2 and 3. The grants G1 are responsive to the respective requests R1. In particular, the port 0 receives a grant G1 indicating that it can switch data to port 2, the port 2 receives a grant G1 indicating that it can switch data to port 1, and the port 3 receives a grant G1 indicating that it can switch data to port 0. The port 1 does not receive a grant in cycle 2 because it did not issue a request in cycle 1. Then, in cycle 3, data is transferred from the virtual queues (source queues) to the switch in accordance with the grants G1. The transferred data (TD) in cycle 3 is denoted TD1. In particular, data is transferred from port 0 to port 2, data is transferred from port 2 to port 1, and data is transferred from port 3 to port 0. Thereafter, to complete the switching operation, in cycle 4, received data RD1 is transferred from the switch back to the appropriate virtual queues (destination queues). In particular, data is received at port 0 from port 3, data is received at port 1 from port 2, and data is received at port 2 from port 1. Since in cycle 3, the scheduler grants a remaining portion of the request R1 at port 0, which requests transfer of data to port 3. Then, in cycle 4, such data for the remaining portion is transferred from port 0 to port 3. In cycle 5, received data RD1 for the remaining portion is transferred from the switch back to the appropriate virtual queues. In particular, data is received at port 3 from port 0. Hence, in cycle 5, the requests R1 (granted in cycle 2 and 3) have been performed, and all payload are switched to its desired destination port in cycles 4 and 5

Moreover, according to one aspect of the invention, the payload of an earlier request can be transmitted to a switch with a later request. Similarly, the switched payload for a later request can be transmitted from the switch with a grant for an earlier request. Table VI contains another example of the protocol used to switch data through the switch system in which a simplified example of request grant and payload being handled concurrently is presented. In addition to the requests RI from three ports as shown in Table IV and process as shown in Table V, a request R2 is issued in cycle 2 requesting transfer of data from port 2 to port 3. The request R2 from port 2 to port 3 cannot be granted in cycle 3 because scheduler has granted at the request R1 from port 0 to port 3 and thus a port conflict exists. However, in cycle 4, the request R2 is granted. In cycle 4, concurrent with the grants of the request R2, received data RD1 arrives at port 2 from port 0. In cycle 5, the transferred data TD2 from port 2 to port 3 is transmitted to the switch. Then, in cycle 6, the received data RD2 is received at port 3 from port 2 to port 3. Note that in cycle 4 at port 2 of this example, the grant G2 is received at port 2 and the received data RD1 from port 0 to port 2 are concurrently transmitted from the switch to the appropriate virtual queue. Finally, the received data RD2 from port 2 to port 3 is transmitted to port 3 in cycle 6. Hence, a grant of subsequent request (R2) can be transmitted from a switch with the payload for an earlier request R1.

Furthermore, in Table VI, a request R2 is issued in cycle 3 requesting transfer of data from port 3 to port 1. The issuance of this request R2 is done concurrently with the transmission of the transmit data TD1 from port 3 to port 0. Hence, a subsequent request (R2) can be received from a switch with the payload for an earlier request R1. Following in cycle 4, the grant G2 from port 3 to port 1 occurs in cycle 5, then the transmitted data TD2 from port 3 to port is transferred to the switch from port 3 in cycle 5. Then, in cycle 6, the received data RD2 from port 3 to port 1 is transmitted to the virtual queue on port 1.

TABLE VI

|  | Cycle: 1 | Cycle: 2 | Cycle: 3 | Cycle: 4 | Cycle: 5 | Cycle: 6 |
|---|---|---|---|---|---|---|
| Port 0 | R1(0-2,3) | — | TD1(0->2) | TD1(0->3) | — | — |
|  | — | G1(0->2) | G1(0->3) | RD1(3->0) | — | — |
| Port 1 | — | — | — | — | — | — |
|  | — | — | — | RD1(2->1) | — | RD2(3->1) |
| Port 2 | R1(2->1) | R2(2->3) | TD1(2->1) | — | TD2(2->3) |  |
|  | — | G1(2->1) | — | G2(2->3)/ RD1(0->2) | — |  |
| Port 3 | R1(3->0) | — | R2(3->1) TD1(3->0) | — | TD2(3->1) | — |
|  | — | G1(3->0) | — | G2(3->1) | RD1(0->3) | RD2(2->3) |

The switch, switching apparatus or switching system can represented a variety of devices or apparatuses. Examples of such devices or apparatuses include: switches, routers, bridges, gateways, etc.

The invention is preferably implemented in hardware, but can be implemented in a combination of hardware and software. Such software can also be embodied as computer readable code on a computer readable medium. Examples of computer readable code includes program instructions, such as machine code (e.g., produced by a compiler) or files containing higher level code that may be executed by a computer using an interpreter or other means. The computer readable medium is any data storage device that can store data which can be thereafter be read by a computer system. Examples of the computer readable medium include read-only memory, random-access memory, CD-ROMs, magnetic tape, optical data storage devices, or carrier waves. In the case of carrier waves, the invention can be embodied in a carrier wave travelling over an appropriate medium such as airwaves, optical lines, electric lines, etc. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that higher bandwidth switching can be obtained. Another advantage of the invention is that the architecture is extensible and thus scalable with technological improvements. Another advantage of the invention is that improved fault tolerance is supported.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for operating a switching apparatus having multiple virtual queues and multiple switch chips, said method comprising:
   (a) receiving an incoming packet to be passed through the switching apparatus;
   (b) dividing the incoming packet into a plurality of fixed length blocks, the blocks including at least a header, a payload and a payload header, the header including control information, and the payload header including a destination identifier for the payload;
   (c) temporarily storing the blocks in the virtual queues;
   (d) determining when the payloads associated with the blocks associated with the incoming packet that are stored in the virtual queues are to be passed through the switch chips;
   (e) concurrently transferring each of the payloads and their payload headers for the blocks that are associated with the incoming packet from the virtual queues to different ones of the switch chips when said determining (d) determines that the payloads associated with the blocks are to be passed through the switch chips; and
   (f) concurrently switching the blocks associated with the incoming packet through the switch chips in accordance with the destination identifier provided within the payload header of each of the blocks,
   wherein said dividing (b) operates to divide the incoming packet into blocks of multiple types, and
   wherein the multiple types include at least a first type and a second type, wherein the size of the header of the blocks of the second type is smaller than the size of the header of the blocks of the first type, and wherein the amount of the data within the blocks of the second type is greater than the amount of the data within the blocks of the first type.

2. A method as recited in claim 1, wherein said receiving (a) of the incoming packet is received at an incoming port, and wherein the destination identifier indicates a destination port.

3. A method as recited in claim 1, wherein two or more of the fixed length blocks represent a cell, and two or more of the cells represent the incoming packet.

4. A method as recited in claim 1, wherein the destination identifier includes a reference indicator for one of the virtual queues.

5. A method as recited in claim 4, wherein said determining (d) comprises:
   (d1) requesting to transfer the blocks associated with the incoming packet; and
   (d2) receiving a grant to transfer the blocks associated with the incoming packet.

6. A method as recited in claim 5, wherein the grant informs the one of the virtual queues of the blocks to be concurrently transferred during said transferring (e).

7. A method as recited in claim 1, wherein at least one of said switch chips comprises a scheduler that determines when blocks stored within the virtual queues are passed through the switch chips.

8. A method as recited in claim 7, wherein said determining (d) comprises:
   (d1) sending requests to transfer blocks from one or more of the virtual queues to the scheduler, and
   (d2) determining, at the scheduler, one or more of the requests to be simultaneously granted; and
   (d 3) informing the one or more of the virtual queues of the one or more of the requests that have been granted.

9. A method as recited in claim 8, wherein said sending (d1) sends subsequent requests to transfer blocks from one or more of the virtual queues concurrently with said transferring (e) of blocks associated with an earlier request.

10. A method as recited in claim 9, wherein the requests are provided within at least one of the blocks associated with the incoming packet.

11. A method as recited in claim 8, wherein the requests are provided within at least one of the blocks associated with the incoming packet.

12. A method as recited in claim 7, wherein the blocks of the first type are sent to the switch chip including the scheduler, and the blocks of the second type are sent to the switch chips not including a scheduler.

13. A method as recited in claim 12, wherein the blocks of the first type can include a request.

14. A method as recited in claim 1, wherein the header of each of the blocks further includes a block type so that the multiple types of blocks can be distinguished.

15. A method for operating a switching apparatus having multiple virtual queues and multiple switch chips, said method comprising:
   (a) receiving an incoming packet to be passed through the switching apparatus;
   (b) dividing the incoming packet into a plurality of fixed length blocks, the blocks including at least a header and a payload, the header including control information;
   (c) temporarily storing the blocks in the virtual queues;
   (d) concurrently transferring the header and the payloads for the blocks that are associated with the incoming packet from the virtual queues to different ones of the switch chips;

(e) scheduling, independently and simultaneously at each of the switch chips, when the payloads associated with the blocks associated with the incoming packet are to be passed through the switch chips; and (f) concurrently switching the blocks in accordance with said scheduling (e), wherein said dividing (b) operates to divide the incoming packet into blocks of multiple types, and wherein the multiple types include at least a first type and a second type, wherein the size of the header of the blocks of the second type is smaller than the size of the header of the blocks of the first type and wherein the amount of the data capable of being stored within the blocks of the second type is greater than the amount of the data capable of being stored within the blocks of the first type.

16. A method as recited in claim 15, wherein at least one of the switch chips comprises a scheduler that determines when blocks stored are passed through the switch chips.

17. A method as recited in claim 16, wherein the blocks of the first type are sent to the switch chip including the scheduler, and the blocks of the second type are sent to the switch chips not including a scheduler.

18. A method as recited in claim 17, wherein the blocks of the first type can include a request.

19. A method as recited in claim 15, wherein two or more of the fixed length blocks represent a cell, and two or more of the cells represent the incoming packet.

* * * * *